United States Patent Office 3,038,884
Patented June 12, 1962

3,038,884
LINEAR POLYURETHANES FROM 2,2,4,4-TETRA-ALKYL-1,3-CYCLOBUTANEDIOLS
James C. Martin and Edward U. Elam, Kingsport, Tenn., assignors to Eastman Kodak Company, Rochester, N.Y., a corporation of New Jersey
No Drawing. Filed Jan. 25, 1960, Ser. No. 4,185
21 Claims. (Cl. 260—77.5)

This invention relates to highly polymeric linear condensation polymers derived from either or both of cis- or trans-2,2,4,4-tetraalkyl-1,3-cyclobutanediols. This diol can be condensed with a bifunctional hydrocarbon diisocyanate (minor proportions of other bifunctional reactants may be used in lieu of the diisocyanate such as dicarboxylic acids, hydroxycarboxylic acids, aminocarboxylic acids, etc. In addition, this diol can be converted to its bischloroformate and then condensed with a diamine such as 1,4-cyclohexane bismethylamine, 1,6-hexanediamine, etc.

A particular embodiment of this invention relates to highly polymeric linear polyurethanes prepared by condensing either or both of cis- or trans-2,2,4,4-tetramethyl-1,3-cyclobutanediol by either of the described procedures. The polyurethanes of this invention melt at from 150° to 350° C. can be formed into fibers and films and are exceptionally stable to physical and chemical degradation.

It is an object of this invention to provide new and useful highly polymeric linear polyurethanes and other related highly polymeric linear condensation polymers derived from 2,2,4,4-tetraalkyl-1,3-cyclobutanediols.

It is a further object of this invention to provide such condensation polymers from which highly useful fibers and films can be prepared which can be employed in the manufacture of valuable fabrics, wrapping materials, supports for photographic emulsions, electrical insulators, etc. A still further object of this invention is to provide such new and suitable condensation polymers suitable for the manufacture of molded products.

Other objects are apparent from the description herein and the claims which follow.

According to an especially advantageous embodiment of this invention the above and other objects can be attained by providing a linear polyurethane of (1) a glycol containing from 2 to 20 carbon atoms of which at least 50 mole percent is at least one of the cis and trans isomers of 2,2,4,4-tetraalkyl-1,3-cyclobutanediols wherein the alkyl radicals contain from 1 to 4 carbon atoms and (2) a bifunctional hydrocarbon diisocyanate wherein the hydrocarbon moiety is selected from the group consisting of divalent non-functional aromatic and aliphatic organic radicals containing from 2 to 25 carbon atoms, said polyurethane being characterized by melting at from about 150°–350° C., having an inherent viscosity measured in dimethylformamide of at least about 0.3, being capable of forming fibers and having improved stability to loss of inherent viscosity (a) in a molten condition normally causing thermal degradation and (b) when fibers and films are exposed to aqueous alkaline solutions normally producing hydrolytic degradation.

Products closely related to this invention are provided in a copending application by Elam, Martin and Gilkey, Serial No. 860,375 filed December 18, 1959, which covers linear polyesters and polyesteramides from 2,2,4,4-tetraalkyl-1,3-cyclobutanediols. A method for preparing 2,2,-4,4-tetraalkyl-1,3-cyclobutanediols is disclosed in the copending application of Hasek and Elam, Serial No. 728,083 filed April 14, 1958, now U.S. Patent No. 2,936,324.

The polyurethanes of this invention are a new and unobvious significant species of linear polyurethanes which are generally known and described in the prior art. For example, a polyurethane known as Perlon U has been developed as a result of work done in Germany and is the condensation product from 1,4-butanediol and hexamethylene diisocyanate.

The prior art discloses that a number of glycols have been used in the preparation of polyurethanes but the resulting polymers suffer from one or more of several deficiencies including low melting points, poor hydrolytic stability, poor thermal stability, poor susceptibility to the standard fabrication techniques, etc.

Among the glycols used in the preparation of polyurethanes have been glycols containing cyclic structures such as the cyclohexane ring; however, the polymeric urethanes produced have been tested and show poor thermal stability and such glycols are believed to have shown no commercial promise prior to the unobvious discovery contemplated by the present invention which provides a new class of linear polyurethanes that exhibit high melting points, good thermal stability and good hydrolytic stability.

It is not believed that any of the polyurethanes known in the prior are combine all of these properties to the advantageous degree characterizing the present invention.

The polymers of the present invention can be produced by any of a number of different reactions including (1) reaction between a diisocyanate and a glycol, (2) condensation of a bischloroformic ester of a glycol and a diamine, the intermediate bischloroformate being made by the action of phosgene on the glycol, (3) from a glycol and a bis-carbamic ester prepared by the action of phosgene on a diamine in the presence of phenol, etc. It is contemplated that the glycol used will include a substantial and preferably a major proportion of a 2,2,4,4-tetraalkyl-1,3-cyclobutanediol.

The remainder of this specification will particularly relate to polyurethanes prepared from 2,2,4,4-tetramethyl-1,3-cyclobutanediol which will hereinafter be designated as TMCD or the bischloroformate hereinafter referred to as TMCD–BCF. Either the latter or TMCD can be used as either the cis or trans isomer or a mixture of such isomers. Unless otherwise specified in the processes described below, a mixture of these isomers is employed. The manufacture of TMCD–BCF can be accomplished by procedures not involved in the present invention based on work done by Caldwell and Jackson or by other techniques reacting the diol and phosgene together in a suitable medium.

Further information concerning the general utility of TMCD in preparing condensation polymers as well as the structural configuration of the polymers produced can be found by reference to the above cited application of Elam, Martin and Gilkey. It is, therefore, not considered appropriate to lengthen the present specification by including descriptive subject matter not directly pertinent to the present invention since those skilled in the art with which this invention pertains will find the disclosure herein more than adequate.

One of the preferred processes for preparing the polyurethanes of the present invention comprises the reaction between a diisocyanate and a glycol which can be allowed to react either in a hot solvent or as a melt with no solvent. When a solvent is employed the polymer can generally be precipitated upon cooling and filtered from the solvent. It is preferred in such cases to employ solvent that is inert to the reactants, dissolves the polymer and is sufficiently high boiling to insure adequate rapidity of reaction. Liquids such as chlorobenzene, orthodichlorobenzene, dimethylformamide, tetrachloroethane and other chlorinated hydrocarbons containing from 1 to 15 carbon atoms, etc. are advantageous media for carrying out the reaction producing the polyurethanes of this invention. Although the reaction can be run without a catalyst it is preferred that a tertiary base be employed as a catalyst such as triethylamine, pyridine and other tertiary nitrogenous bases containing from 3 to 12 carbon atoms. It has been found advantageous to add the diisocyanate slowly to a refluxing solution of glycol whereby advantageously high molecular weight buildup can be achieved.

The reaction of the glycol and the diisocyanate can be carried out as a melt as well as by using the above described solution process. In the melt type reaction the temperature used is governed by the ultimate melting point of the polymer. It is generally advantageous to employ a temperature slightly above the melting point of the polymer so as to reduce the possibility of cross-linking or degradation although the polymers of this invention are highly resistant to thermal degradation. The reactants may be added all at once or the diisocyanate may be added in increments. The melt type reaction is generally continued until the viscosity of the melt is so great that stirring is impractical. If desired, the well-known solid phase techniques can be employed for further polymerization.

The bifunctional hydrocarbon diisocyanates which can be employed in accordance with the present invention include hexamethylene diisocyanate, p,p'-methylenebis-(phenylisocyanate), metatolylenediisocyanate, octa-methylene diisocyanate, para-tolylene-diisocyanate, and any of the other vast number of diisocyanates described in the prior art relating to the preparation of polyurethanes. The particular diisocyanates employed in accordance with this invention are only incidentally related to the inventive concept which centers around the condensation of TMCD and its isomers and homologs with any diisocyanate which is capable of producing a polyurethane having the properties contemplated by this invention.

This invention can be further illustrated by the following examples of preferred embodiments although it will be understood that these examples are included merely for purposes of illustration and are not intended to limit the scope of the invention unless otherwise specifically indicated:

Example 1

A melt of 14.4 g. (0.1 mole) of 2,2,4,4-tetramethyl-1,3-cyclobutanediol (mixture of cis- and trans-isomers) was prepared by stirring at 170° C. To this was added 25.0 g. (0.1 mole) of p,p'-methylenebis(phenylisocyanate) over a period of 1 hr., while the temperature of the reaction mixture was slowly raised to 300° C. The melt became very viscous and stirring had to be stopped, but heating was continued at 300° C. for 15 min. The polymer was dissolved from the reaction flask with hot dimethylformamide. The polymer was precipitated as a light tan solid (35 g.) by adding this solution to rapidly stirred methyl alcohol. The polymer had an inherent viscosity of 0.53 when measured in dimethylformamide. The melting point, as determined under crossed nicols on the hot stage of a microscope, was 235–255° C.

A film cast from dimethylformamide solution was clear, flexible and quite tough. Strong fibers were prepared by melt extrusion through a spinneret at 300° C.

A sample of this polymer was heated in 1% sodium hydroxide solution at 50° C. for 4 days. No change in the inherent viscosity occurred. This demonstrates the hydrolytic stability of the polymer.

Example 2

A solution of 14.4 g. (0.1 mole) of 2,2,4,4-tetramethyl-1,3-cyclobutanediol, 0.5 ml. of pyridine and 200 ml. of chlorobenzene was prepared. To this refluxing solution was added dropwise a solution of 17.4 g. (0.1 mole) of m-tolylenediisocyanate in 50 ml. of chlorobenzene. The first half of the solution was added over a 30 min. period and the remainder over a period of 4 hrs. Refluxing was continued for 3 hrs. more. After cooling, 25.4 g. of a white polymer was obtained by filtration. This was dissolved in acetone and precipitated by adding the solution to rapidly stirred water. The resulting polyurethane had an inherent viscosity, as measured in dimethylformamide, of 0.41 and M.P. 205–215° C. It formed a tough film when cast from an acetone solution.

Example 3

Under the same conditions as described in Example 1, 16.14 g. (0.1075 mole) of 2,2,4,4-tetramethyl-1,3-cyclobutanediol and 15.01 g. (0.107 mole) of hexamethylene diisocyanate reacted to give a good yield (90%) of the polyurethane. This polymer gave a very flexible film when formed by pressure in the melted state and cooled rapidly.

Example 4

Under the same conditions as described in Example 1, 20.0 g. (0.1 mole) of 2,2,4,4-tetraethyl-1,3-cyclobutanediol and 25.0 g. (0.1 mole) of p,p'-methylenebis(phenylisocyanate) reacted at temperatures up to 300° C. to give a good yield (87%) of the corresponding polyurethane.

The polyurethanes of the present invention may be schematically illustrated by the following equation which depicts the condensation reaction and shows the recurring units in the polyurethane molecules:

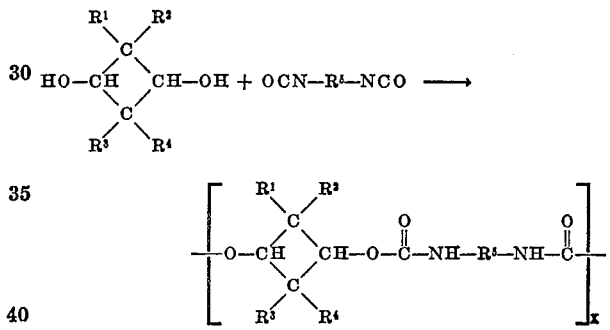

wherein each $R^1$, $R^2$, $R^3$, and $R^4$ represents a member selected from the group consisting of alkyl radicals containing from 1 to 4 carbon atoms and $R^5$ is a divalent nonfunctional hydrocarbon radical containing from 2 to 20 carbon atoms.

In practicing the present invention the use of pure isomers of TMCD or TMCD–BCF or their homologs can be employed whereby using the substantially pure trans isomer gives higher melting polymers and sharper melting temperatures. Especially preferred embodiments of the invention contemplate at least 50% of the trans isomer.

The broad range of polymers contemplated by the present invention wherein the TMCD can be partially replaced with other glycols and the diisocyanate can be partially replaced by other bifunctional reactants having melting points as low as about 100° and as high as about 375° C. Such high polymeric linear polymers melting below about 200° C. are primarily useful for the preparation of molding compositions. They can be advantageously extruded to form various shaped objects such as rods, tubes, sheets, etc. They can also be compression molded or otherwise formed into any desired shape. The preferred polyurethanes of the present invention melt at above about 200° C. and have similar utility but are especially advantageous for the preparation of fibers and films having unusual value. Preferred polyurethanes are produced when a substantial proportion of the glycol is trans-TMCD with the remainder of the glycol being cis-TMCD or homologs of cis or trans-TMCD and may include a minor proportion of other glycols containing from 2 to 10 carbon atoms such as ethylene glycol, cyclohexanedimethanol, neopentyl glycol, 1,4-butanediol, etc. The same considerations apply to the use of TMCD–BCF.

Although a great number of different diisocyanates can be employed practicing the present invention, especially advantageous results can be achieved when the diisocyanate is a p,p'- bis(phenylisocyanate) of a divalent hydrocarbon moiety which can be either aliphatic or aromatic such as p,p'-methylenebis(phenylisocyanate) and related compounds wherein the methylene radicals are replaced with alkylene radicals or a cyclo aliphatic or aromatic radical.

The second of the preferred processes for preparing the polyurethanes of this invention comprises a reaction which can be schematically illustrated by the following equation which depicts the condensation reaction and shows that the recurring units in the polyurethane molecules are the same as depicted hereinabove:

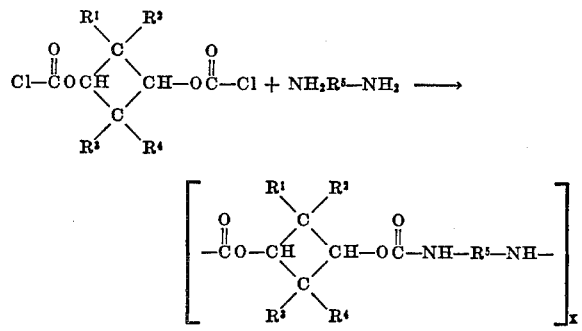

wherein $R^1$, $R^2$, $R^3$, $R^4$ and $R^5$ have been defined above.

In preparing polyurethanes by this process it is preferred to use a two phase system which is well agitated. The aqueous phase consists of an alkaline material that will react efficiently with the hydrogen chloride liberated by the reaction. Such materials are sodium bicarbonate, sodium carbonate, sodium hydroxide, potassium hydroxide, etc. The organic solvent used is one that does not react with any of the components in the system, is insoluble in water and will dissolve the bis-chloroformates. An emulsifying agent, such as Dupanol ME-sodium lauryl sulfate, is desirable, but not necessary for this preparation. Generally, a reaction temperature of 0° to 40° C. is preferred.

Diamines that are suitable for the practice of this phase of the invention may be either aliphatic or aromatic. Some typical amines include 1,6-hexanediamine, ethylenediamine, 1,4-cyclohexanebis-methylamine, p,p'-methylenedianiline, p-phenylenediamine, etc.

Additional examples which will serve to further illustrate the invention using the process employing diamines are as follows:

Example 5

A mixture of 4 g. of sodium carbonate, 15 ml. of water, 2 g. (.014 mole) of 1,4-cyclohexanebis(methylamine) and 0.25 g. of Dupanol ME was stirred rapidly in an ice bath while a solution of 3.5 g. (.013 mole) 2,2,4,4-tetramethyl-1,3-cyclobutanediol bis(chloroformate) in 10 ml. of methylene chloride was added slowly. Stirring was continued for 15 min. after the addition. The mixture was filtered to remove the white polymer that had precipitated. The polymer was washed several times with water, then with methylene chloride and finally dried in a 50° C. oven. A theoretical yield of the polyurethane was obtained, softening at 250–280° C., inherent viscosity (as measured in 60% phenol 40% tetrachloroethane) of 0.61. This polymer yielded a tough film when formed by pressure in the melted state and cooled rapidly.

Example 6

A mixture of 4 g. of sodium carbonate, 15 ml. of water, 2.76 g. (.014 mole) of p,p'-methylenedianiline, 0.25 g. of Dupanol ME and 3.66 g. (.013 mole) of 2,4-diethyl-2,4-dimethyl-1,3-cyclo-butanediol bis(chloroformate) in 10 ml. of methylene chloride were allowed to react as described in Example 5. The resulting polymer softened at 190–210° C. and had an inherent viscosity of 0.66.

Example 7

A mixture of 2 g. of sodium hydroxide, 15 ml. of water, 0.82 g. (.014 mole) of ethylene diamine and 3.5 g. (.013 mole) of 2,2,4,4-tetramethyl-1,3-cyclobutanediol bis(chloroformate) in 10 ml. of chloroform were allowed to react as described in Example 5. The resulting polymer melted at 300–310° C. and had an inherent viscosity of 0.53.

The polyurethanes of Examples 5, 6 and 7 were fiber-forming as well as capable of forming films and were the same as polymers made as described above from TMCD rather than TMCD-BCF. The illustrations of diisocyanates and diamines include these compounds wherein the non-functonal hydrocarbon moiety are inter-changeable as to either process.

Since the polymers are the same regardless of the process used it is intended that the claims below which define the polymers per se are not in any way limited as to whether the process uses (1) TMCD, TMCD-BCF or homologs thereof and (2) diisocyanates or diamines. Thus, the polymer of Example 5 can be defined as a polyurethane of TMCD and 1,4-cyclohexanebismethylisocyanate.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A linear polyurethane consisting essentially of the following constituents (1) a glycol containing from 2 to 20 carbon atoms of which at least 50 mole percent is at least one of the cis and trans isomers of 2,2,4,4-tetraalkyl-1,3-cyclobutanediols wherein the alkyl radicals contain from 1 to 4 carbon atoms and (2) a bifunctional hydrocarbon diisocyanate wherein the hydrocarbon moiety is selected from the group consisting of divalent nonfunctional aromatic and aliphatic organic radicals containing from 2 to 25 carbon atoms, said polyurethane being characterized by melting at from about 150°–350° C., having an inherent viscosity measured in dimethylformamide of at least about 0.3, being capable of forming fibers and having improved stability to loss of inherent viscosity (a) in a molten condition normally causing thermal degradation and (b) when fibers and films are exposed to aqueous alkaline solutions normally producing hydrolytic degradation.

2. A polyurethane as defined by claim 1 wherein the glycol (1) is 2,2,4,4-tetramethyl-1,3-cyclobutanediol.

3. A polyurethane as defined by claim 2 wherein the glycol is composed of at least 50 mole percent of the trans isomers.

4. A polyurethane as defined by claim 2 wherein the diisocyanate (2) is p,p'-methylenebis(phenylisocyanate).

5. A polyurethane as defined by claim 2 wherein the diisocyanate (2) is m-tolylenediisocyanate.

6. A polyurethane as defined by claim 2 wherein the diisocyanate (2) is 1,4-cyclohexanebismethylisocyanate.

7. A polyurethane as defined by claim 2 wherein the diisocyanate (2) is 1,2-ethylenediisocyanate.

8. A polyurethane as defined by claim 1 wherein the glycol (1) is 2,2,4,4-tetraethyl-1,3-cyclobutanediol and the diisocyanate (2) is p,p'-methylenebis(phenylisocyanate).

9. A fiber of the polyurethane defined by claim 1.
10. A fiber of the polyurethane defined by claim 2.
11. A fiber of the polyurethane defined by claim 3.
12. A fiber of the polyurethane defined by claim 6.
13. A fiber of the polyurethane defined by claim 7.

14. A fiber of the polyurethane defined by claim 8.
15. A film of the polyurethane defined by claim 1.
16. A film of the polyurethane defined by claim 2.
17. A film of the polyurethane defined by claim 3.
18. A film of the polyurethane defined by claim 7.
19. A film of the polyurethane defined by claim 8.
20. A fiber of the polyurethane defined by claim 4.
21. A film of the polyurethane defined by claim 4.

References Cited in the file of this patent

UNITED STATES PATENTS

| | | |
|---|---|---|
| 2,284,637 | Catlin | June 2, 1942 |
| 2,808,391 | Pattison | Oct. 1, 1957 |
| 2,926,145 | McConnell et al. | Feb. 23, 1960 |
| 2,936,324 | Hasek et al. | May 10, 1960 |
| 2,952,666 | Coover et al. | Sept. 13, 1960 |
| 2,956,961 | Kibler et al. | Oct. 18, 1960 |